(12) United States Patent
O'Brien et al.

(10) Patent No.: US 10,537,064 B2
(45) Date of Patent: *Jan. 21, 2020

(54) RETRACTION MECHANISM FOR EXTENDABLE CARRIAGES OF AN AGRICULTURAL ACCUMULATOR

(71) Applicant: Deere & Company, Moline, IL (US)

(72) Inventors: Stephen E. O'Brien, Moline, IL (US); Austin J. Jones, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,012

(22) Filed: Feb. 26, 2019

(65) Prior Publication Data

US 2019/0183054 A1 Jun. 20, 2019

Related U.S. Application Data

(63) Continuation of application No. 15/427,987, filed on Feb. 8, 2017, now Pat. No. 10,212,886.

(Continued)

(51) Int. Cl.
*A01D 85/00* (2006.01)
*A01D 90/08* (2006.01)
*A01F 15/08* (2006.01)

(52) U.S. Cl.
CPC ........... *A01D 85/005* (2013.01); *A01D 90/08* (2013.01); *A01F 15/0883* (2013.01); *A01D 2085/007* (2013.01)

(58) Field of Classification Search
CPC .................. A01D 85/005; A01D 90/08; A01D 2085/007; A01F 15/0883

(Continued)

(56) References Cited

U.S. PATENT DOCUMENTS 3,163,302 A 12/1964 Pridgeon
4,310,275 A 1/1982 Hoelscher
(Continued)

FOREIGN PATENT DOCUMENTS

AU 568143 12/1987
AU 2003262343 6/2005
(Continued)

OTHER PUBLICATIONS

EP17164303 Extended European Search Report dated Sep. 18, 2017 (6 pages).

(Continued)

*Primary Examiner* — Lynn E Schwenning
(74) *Attorney, Agent, or Firm* — Michael Best & Friedrich LLP (57) ABSTRACT

An accumulator is coupled to an agricultural baler and includes a frame having a first end, a second end, and a support structure positioned between the first and the second ends. The accumulator includes a crop package moving assembly moveably coupled to the frame in a first direction and in a second direction. The crop package moving assembly is configured to move a crop package in the first direction. The accumulator includes a carriage coupled to the first end of the frame and configured to move relative to the frame between a retracted position and an extended position. The carriage is configured to move into the extended position to support the crop package. The carriage is also configured to move from the extended position into the retracted position in response to the crop package being removed from the carriage and the crop package moving assembly moving in the second direction.

19 Claims, 10 Drawing Sheets

Related U.S. Application Data (60) Provisional application No. 62/320,154, filed on Apr. 8, 2016.

(58) Field of Classification Search
USPC ........ 414/24.5, 111, 132, 334; 280/638, 656
See application file for complete search history.

(56) References Cited

U.S. PATENT DOCUMENTS

| | | |
|---|---|---|
| 4,549,840 A | 10/1985 | Ansbjer |
| 4,789,289 A | 12/1988 | Wilson |
| 4,844,675 A | 7/1989 | Strasser et al. |
| 4,955,774 A | 9/1990 | Van Eecke et al. |
| 4,961,679 A | 10/1990 | Van Eecke et al. |
| 5,180,271 A | 1/1993 | Farden |
| 5,211,345 A | 5/1993 | Siebenga |
| 5,842,823 A | 12/1998 | Kohnen et al. |
| 6,053,685 A | 4/2000 | Tomchak |
| 6,425,235 B1 | 7/2002 | Spaniol et al. |
| 6,478,523 B1 | 11/2002 | Meijer |
| 6,537,008 B1 | 3/2003 | Haring |
| 6,851,908 B2 | 2/2005 | Bergen et al. |
| 6,892,632 B1 | 5/2005 | Viesselmann et al. |
| 7,000,533 B2 | 2/2006 | Derscheid et al. |
| 7,401,547 B2 | 7/2008 | Degen |
| 8,414,240 B2 | 4/2013 | Nause |
| 9,253,946 B2 | 2/2016 | Straeter |
| 9,622,420 B2 | 4/2017 | Kraus et al. |
| 10,212,886 B2 * | 2/2019 | O'Brien ............... A01D 85/005 |
| 2006/0086263 A1 | 4/2006 | Degen |
| 2010/0040436 A1 | 2/2010 | Bruha et al. |
| 2012/0328401 A1 | 12/2012 | Sieben |
| 2016/0014966 A1 | 1/2016 | Kraus et al. |
| 2016/0014967 A1 | 1/2016 | Kraus et al. |
| 2016/0014968 A1* | 1/2016 | Kraus ............... A01D 85/005 414/812 |
| 2016/0014969 A1 | 1/2016 | Kraus et al. |
| 2016/0014970 A1 | 1/2016 | Kraus et al. |
| 2016/0014971 A1 | 1/2016 | Kraus |

FOREIGN PATENT DOCUMENTS

| | | |
|---|---|---|
| CA | 2709397 | 5/2000 |
| DE | 2851117 | 6/1980 |
| EP | 983720 | 3/2000 |
| EP | 2923560 | 9/2015 |
| EP | 2974589 | 1/2016 |
| FR | 2679410 | 1/1993 |
| FR | 2751506 | 1/1998 |
| GB | 2106830 | 4/1983 |
| GB | 2204826 | 11/1988 |
| GB | 2297944 | 8/1996 |
| JP | 2003143927 | 5/2003 |
| PL | 158422 | 9/1992 |
| WO | 2014031355 | 2/2014 |

OTHER PUBLICATIONS

United States Patent Office Action for U.S. Appl. No. 14/332,827 dated Oct. 2, 2017 (12 pages).
United States Patent Office Action for U.S. Appl. No. 14/332,827 dated May 9, 2018 (8 pages).
United States Patent Office Action for U.S. Appl. No. 14/332,827 dated Nov. 27, 2018 (10 pages).
United States Patent Office Action for U.S. Appl. No. 14/332,827 dated Jul. 12, 2019 (8 pages).
European Patent Office Search Report and Written Opinion for Application No. 15176510.4 dated Dec. 14, 2015 (4 pages).

* cited by examiner

RETRACTION MECHANISM FOR EXTENDABLE CARRIAGES OF AN AGRICULTURAL ACCUMULATOR

CROSS-REFERENCE TO RELATED APPLICATIONS

This application is a continuation of U.S. patent application Ser. No. 15/427,987, filed Feb. 8, 2017, now U.S. Pat. No. 10,212,886, which claims priority to U.S. Provisional Patent No. 62/320,154, filed Apr. 8, 2016, the contents of both of which are incorporated herein by reference.

BACKGROUND

The present disclosure relates to a retraction mechanism for extendable carriages of an agricultural accumulator that supports crop packages.

SUMMARY

In an aspect, an accumulator is coupled to an agricultural baler and configured to support crop packages exiting the agricultural baler. The accumulator includes a frame having a first end, a second end, and a support structure positioned between the first and the second ends. The accumulator includes a crop package moving assembly moveably coupled to the frame. The crop package moving assembly is configured to move a first crop package in a first direction. The crop package moving assembly is also configured to move a second crop package in a second direction opposite to the first direction. The accumulator includes a first carriage coupled to the first end of the frame and configured to move relative to the frame between a retracted position and an extended position. The first carriage is configured to support the first crop package that exits the agricultural baler. The accumulator includes a second carriage coupled to the second end of the frame and configured to move relative to the frame between a retracted position and an extended position. The second carriage is configured to support the second crop package that exits the agricultural baler. The accumulator includes a retraction linkage coupled to the crop package moving assembly. The retraction linkage is configured to move the first carriage from the extended position into the retracted position while the first crop package is spaced from the first carriage in response to the crop package moving assembly moving in the second direction. The retraction linkage is also configured to move the second carriage from the extended position into the retracted position while the second crop package is spaced from the second carriage in response to the crop package moving assembly moving in the first direction.

In another aspect, an accumulator is coupled to an agricultural baler. The accumulator is configured to support a crop package exiting the agricultural baler. The accumulator includes a frame having a first end, a second end, and a support structure positioned between the first and the second ends. The support structure is configured to support the crop package that exits the agricultural baler. The accumulator includes a crop package moving assembly moveably coupled to the frame for movement in a first direction and a second opposing direction. The crop package moving assembly is configured to move the crop package in the first direction. The accumulator includes a carriage coupled to the first end of the frame and configured to move relative to the frame between a retracted position and an extended position. The carriage is configured to support the crop package. The accumulator includes a retraction linkage coupled to at least one of the frame and the carriage. The retraction linkage is configured to automatically move the carriage from the extended position into the retracted position while the crop package is spaced from the carriage in response to the crop package moving assembly moving in the second direction.

In yet another aspect, an accumulator is coupled to an agricultural baler. The accumulator is configured to support a crop package exiting the agricultural baler. The accumulator includes a frame having a first end, a second end, and a support structure positioned between the first and the second ends. The accumulator includes a crop package moving assembly moveably coupled to the frame in a first direction and in a second direction. The crop package moving assembly is configured to move the crop package in the first direction. The accumulator includes a carriage coupled to the first end of the frame and configured to move relative to the frame between a retracted position and an extended position. The carriage is configured to move into the extended position to support the crop package. The carriage is also configured to move from the extended position into the retracted position in response to the crop package being removed from the carriage and the crop package moving assembly moving in the second direction.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
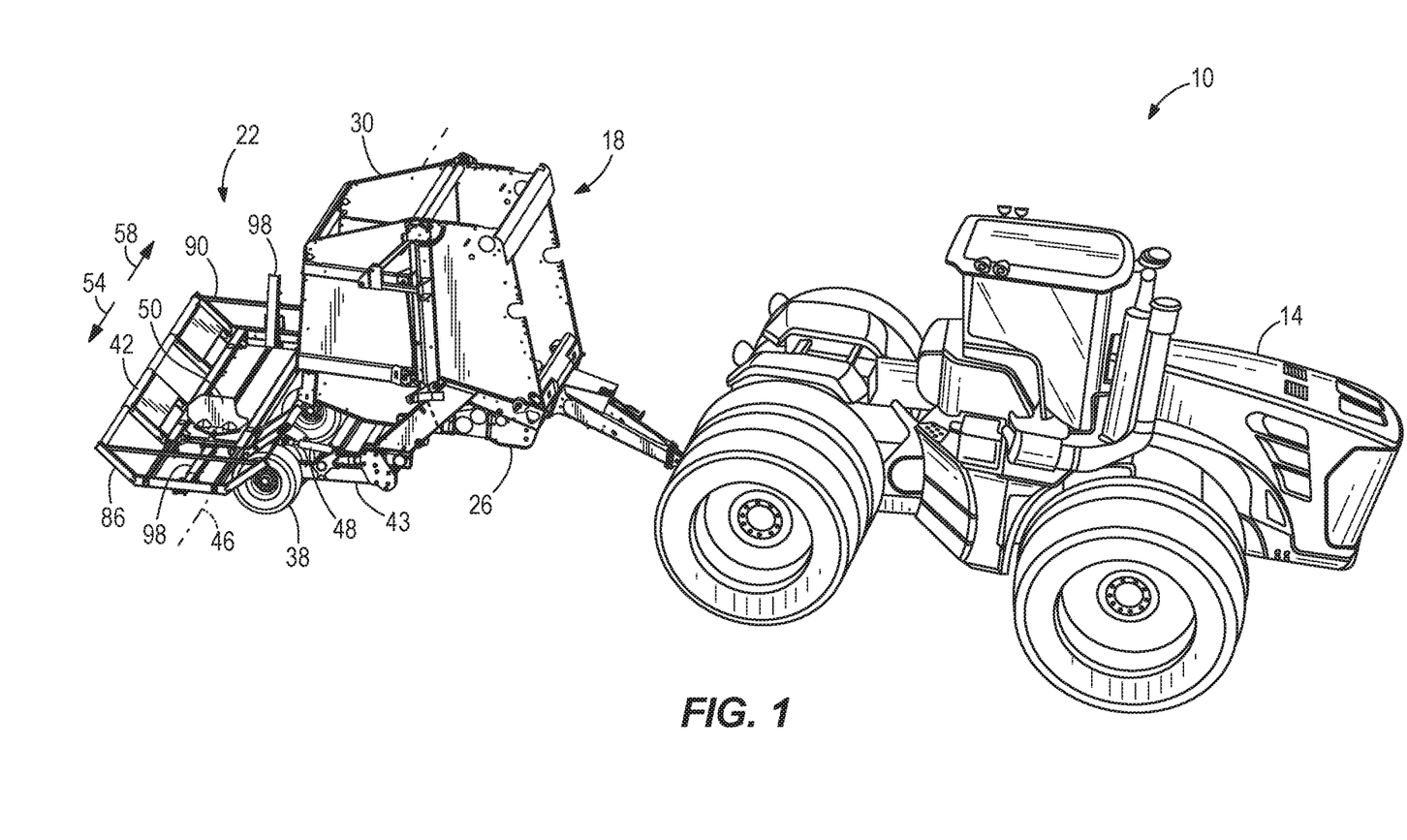
FIG. 1 is a perspective view of agricultural equipment including a vehicle coupled to an agricultural baler and an accumulator according to an embodiment of the disclosure.

FIG. 1 illustrates certain agricultural equipment 10 including a tractor 14, a baler 18, and a crop package accumulator 22. The baler 18 (e.g., a crop packaging system) and the accumulator 22 (e.g., a crop package handling system) are both coupled to the tractor 14, which moves the baler 18 and the accumulator 22 during an agricultural process (e.g., through an agricultural field). The tractor 14 also supplies operational power in the form of hydraulic, electrical, and/or mechanical power to the baler 18 and the accumulator 22.

The illustrated baler 18 is configured to produce generally cylindrical crop packages, e.g., round bales, from an agricultural field. For example, the baler 18 may produce crop packages from hay, corn stalks, and the like. In other embodiments, the baler 18 may produce generally cuboid crop packages, e.g., square bales. In the illustrated embodiment, the baler 18 includes a baler frame 26 to which a baler gate or a crop product barrier 30 is pivotally positionable between a closed position (FIG. 1) and an open position (FIG. 6) by gate hydraulic actuators 34, e.g., hydraulic cylinders. In other embodiments, the baler gate 30 may translate or slide between the closed position and the open position.

Figure 2:
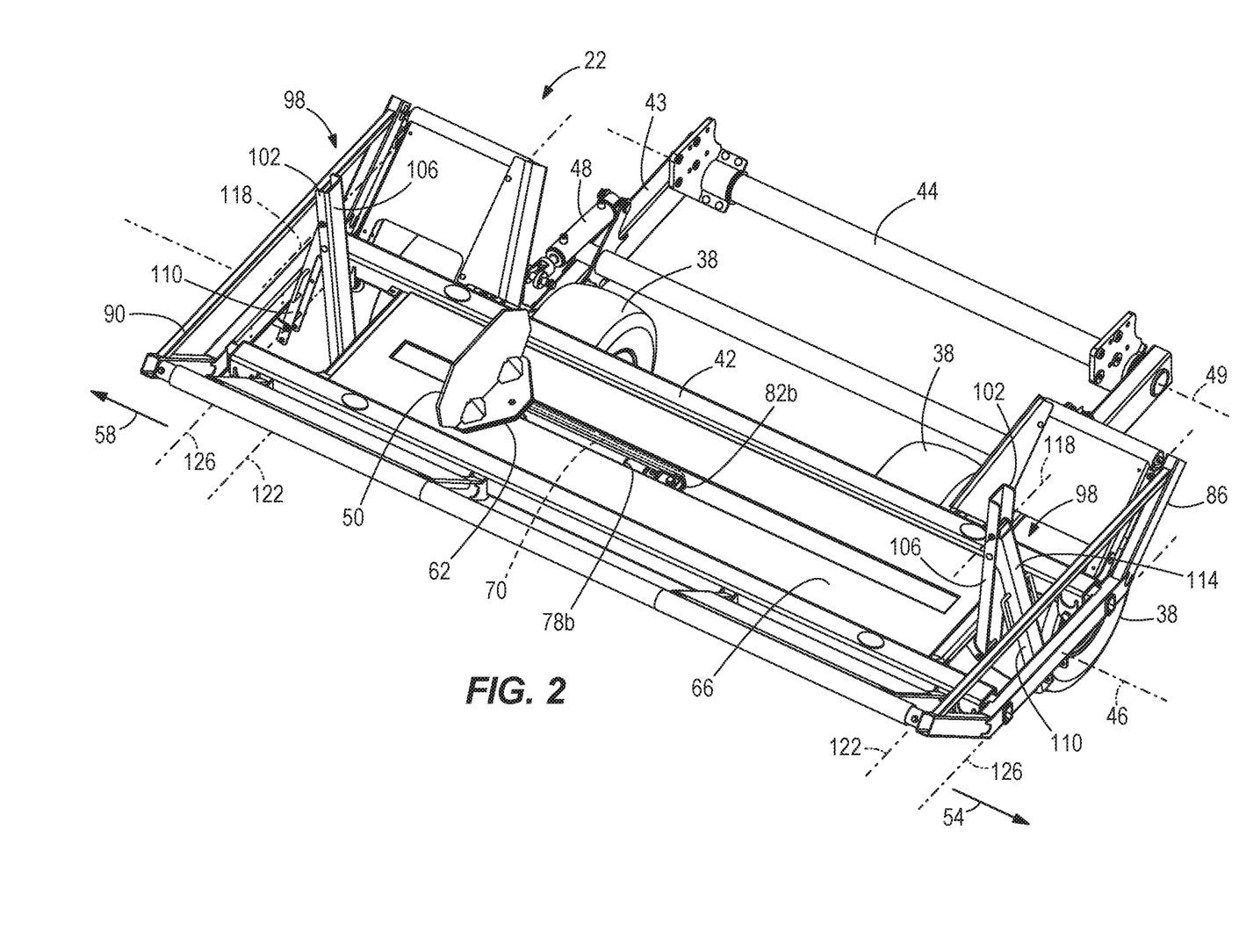
FIG. 2 is a top perspective view of the accumulator of FIG. 1 including extendable carriages in a retracted position.

With reference to FIGS. 1 and 2, the illustrated accumulator 22 is coupled to the baler frame 26 such that the baler 18 and the accumulator 22 are supported above a surface or an agricultural field by at least one common axle and associated structure, e.g., wheels 38, although the accumulator can have its own dedicated axles, wheels, and other supporting structural components. An accumulator support frame 42 is coupled relative to an accumulator frame 43 about a tube 44 (FIG. 3) defining a rotational axis 46 with the accumulator support frame 42 pivotable relative to the accumulator frame 43 via hydraulic actuators 48 coupled therebetween. Also, the accumulator support frame 42 and the accumulator frame 43 rotate relative to the baler frame 26 about an axis 49.

Figure 3:
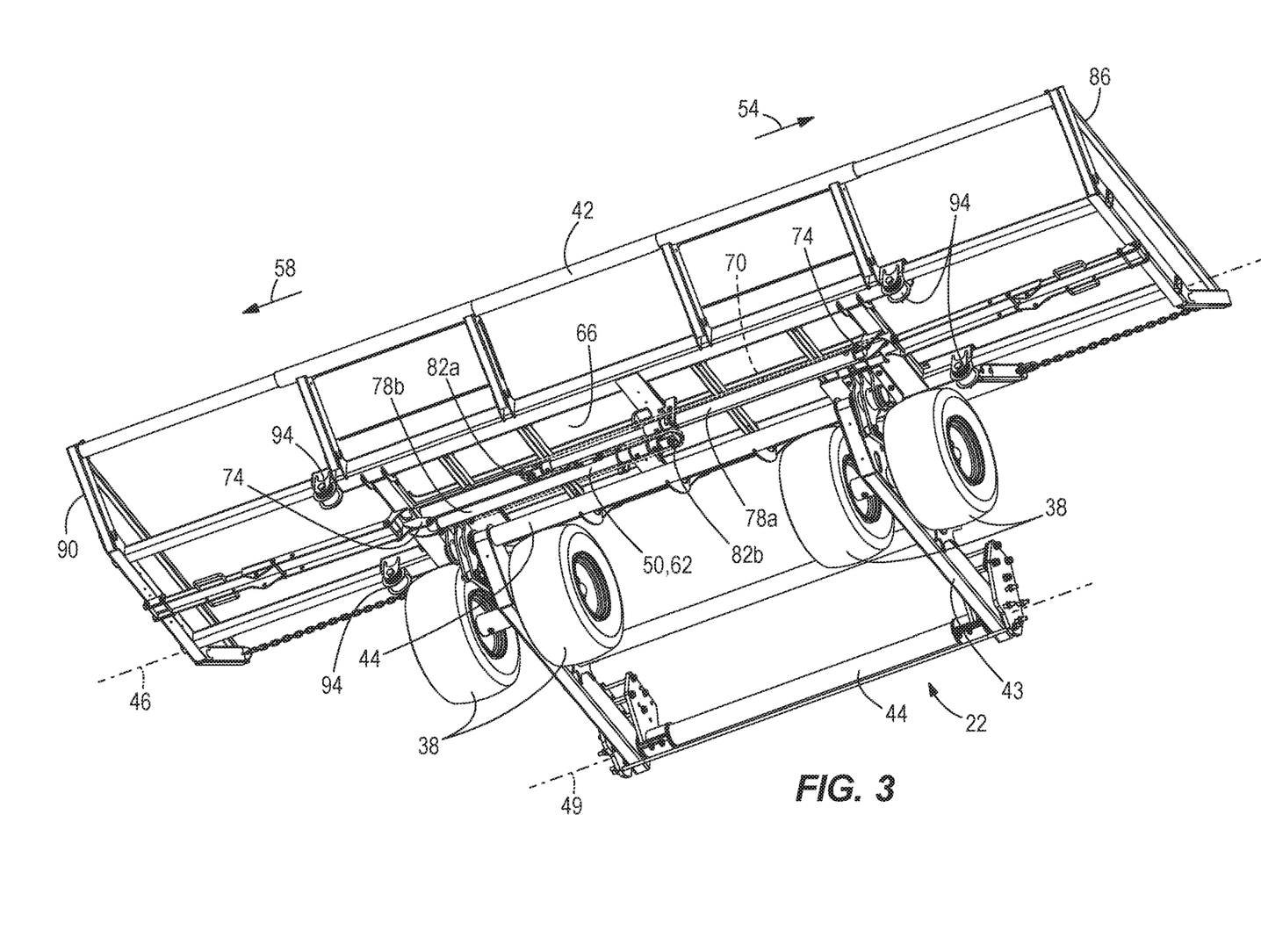
FIG. 3 is a bottom perspective view of the accumulator of FIG. 2.
Figure 4:
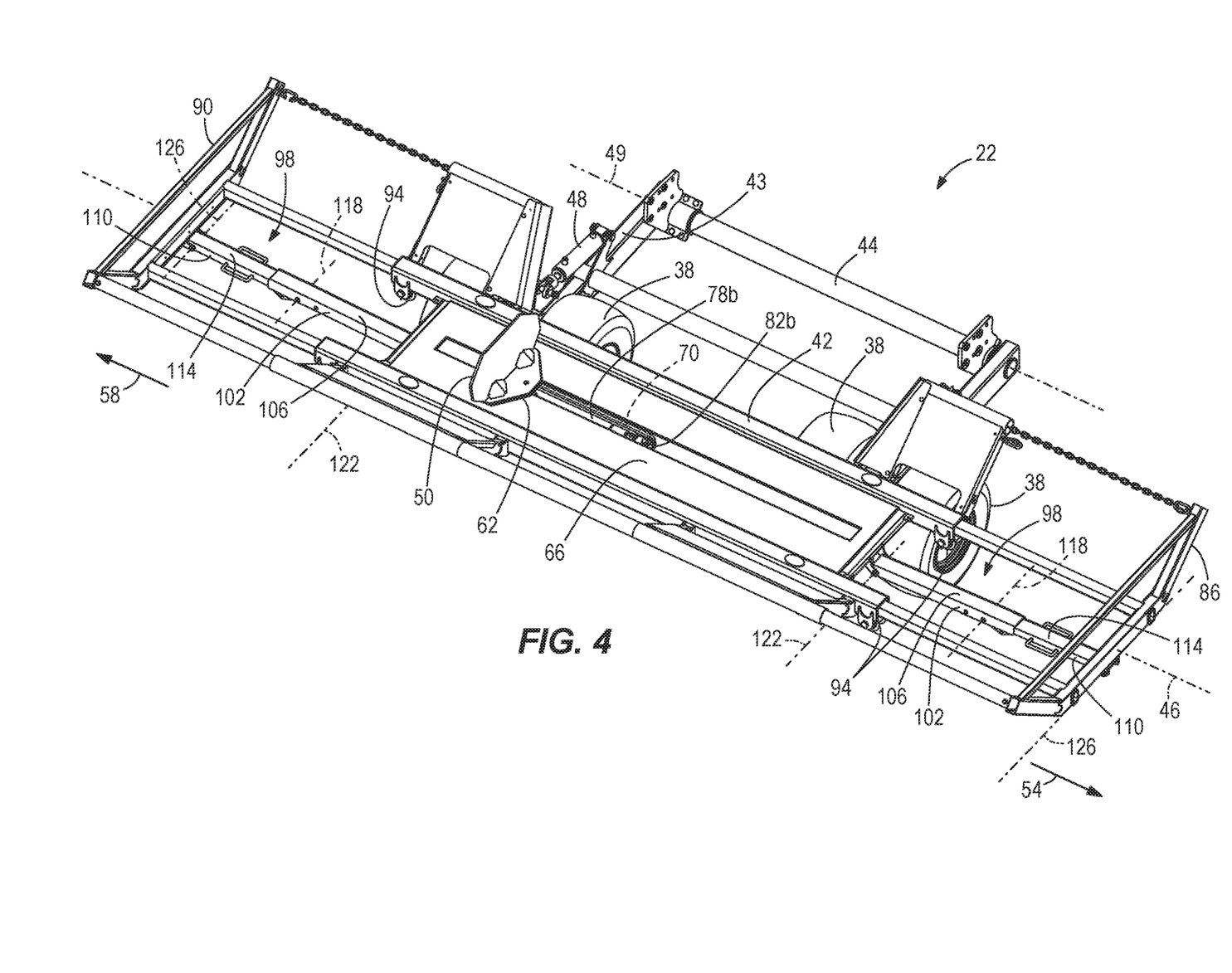
FIG. 4 is a top perspective view of the accumulator of FIG. 1 including the extendable carriages in an extended position.

With reference to FIGS. 2-4, a crop package moving assembly 50 that is illustrated as a plate member is oriented substantially perpendicular to the rotational axis 46. The moving assembly 50 is slidably coupled to the accumulator support frame 42 in a first direction 54 and a second direction 58. In other words, the moving assembly 50 is movable in two opposing directions (e.g., left and right). The illustrated moving assembly 50 includes a base 62 that extends below a support structure 66 (e.g., platform) of the accumulator support frame 42, and is fixedly coupled to a linkage assembly 70, e.g., a roller chain (FIG. 3). In other embodiments, the linkage assembly 70 may be another flexible assembly, e.g., a cable, rope, or the like. In further embodiments, the linkage assembly 70 may use a combination of cables, ropes, and/or the like. Both ends 74 of the linkage assembly 70 are fixed relative to crop package hydraulic actuators 78, e.g., hydraulic cylinders operable by the tractor 14, each including a mechanical guide 82 (e.g., a sprocket) that engages the linkage assembly 70. For example, a first crop package hydraulic actuator 78a is coupled to a first sprocket 82a, and a second crop package hydraulic actuator 78b is coupled to a second sprocket 82b. In the illustrated embodiment, the sprockets 82a, 82b uniformly move together in either direction 54, 58 via engagement between the linkage assembly 70 and the sprockets 82a, 82b. Accordingly, extension of the second hydraulic actuator 78b and retraction of the first hydraulic actuator 78a moves the sprocket 82b in a first direction 54, which pulls the linkage assembly 70 and therefore the base 62 and moving assembly 50 in the first direction 54. Extension of the first hydraulic actuator 78a and retraction of the second hydraulic actuator 78b moves the first sprocket 82a in the second direction 58, which pulls the linkage assembly 70 and therefore the base 62 and moving assembly 50 in the second direction 58. In other embodiments, the crop package hydraulic actuators 78a, 78b may be one hydraulic actuator that is able to move the sprockets 82a, 82b in either direction 54, 58 (e.g., without the linkage assembly 70). In other embodiments, the bale moving assembly 50 is operable by an electric motor, a cylinder and spring arrangement, pneumatic cylinder(s), or any combination thereof coupled to the accumulator 22.

With continued reference to FIGS. 2-4, the illustrated accumulator 22 is also coupled to a first extendable carriage 86 (e.g., a first extendable wing) and a second extendable carriage 90 (e.g., a second extendable wing) both independently moveable generally parallel to the rotational axis 46 between a retracted position (FIG. 2) and an extended position (FIGS. 3 and 4). In particular, a portion of the extendable carriages 86, 90 is slidably or telescopically receivable within the accumulator support frame 42 by engagement with external and/or internal roller wheels 94 attached to the accumulator support frame 42. In other embodiments, the extendable carriages 86, 90 may pivot relative to the accumulator support frame 42 (e.g., pivot perpendicular to the rotational axis 46). Each of the extendable carriages 86, 90 is sized and configured to support crop packages that exit the baler 18. In further embodiments, the accumulator 22 may only include one extendable carriage.

Figure 5:
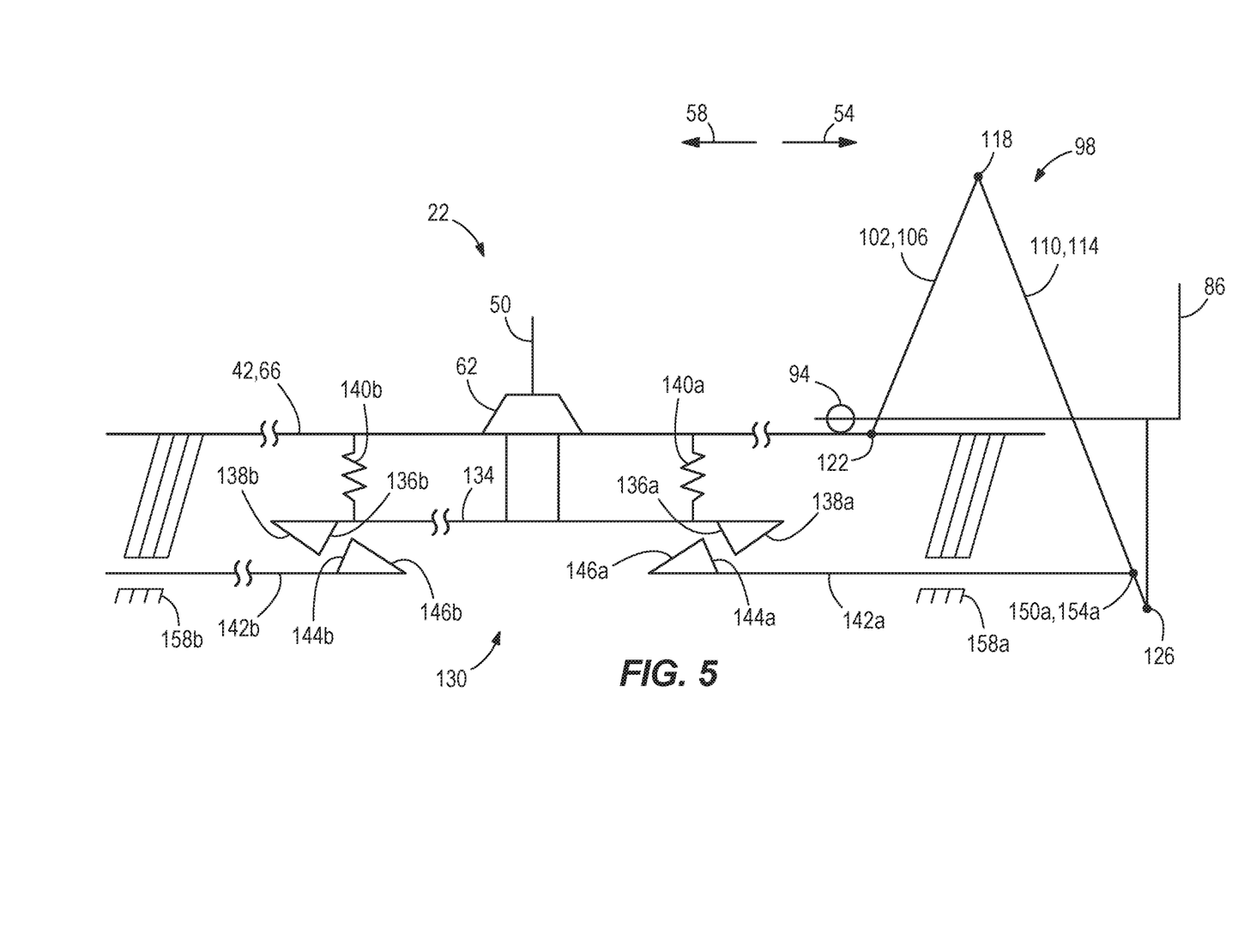
FIG. 5 is a rear view of the accumulator of FIG. 2 including a retraction linkage coupled to the first extendable carriage.

With reference to FIGS. 2, 4, and 5, extension linkages 98 are coupled to each side of the accumulator 22 between one of the extendable carriages 86, 90 and the accumulator support frame 42. Each illustrated linkage 98 includes a first linkage arm 102 having a top surface 106 pivotably coupled to a second linkage arm 110 having a top surface 114 about a first movable pivot axis 118. The first linkage arm 102 is pivotably coupled to the accumulator support frame 42 about a second pivot axis 122, whereas the second linkage arm 110 is pivotably coupled to the extendable carriages 86, 90 about a third pivot axis 126. In the illustrated embodiment, the extension linkages 98 are designed as generally over-center linkages such that the extension linkages 98 can be rotated into a locked position (FIG. 4). In other embodiments, the extension linkages 98 may not be designed as over-center linkages. In further embodiments, the pivot axes 118, 122, 126 may be tilted about the rotational axis 46 (e.g., perpendicular to the ground or otherwise not coincident with the direction of travel), and/or the pivot axes 118, 122, 126 may be oriented non-perpendicular to the rotational axis 46.

Figure 6:
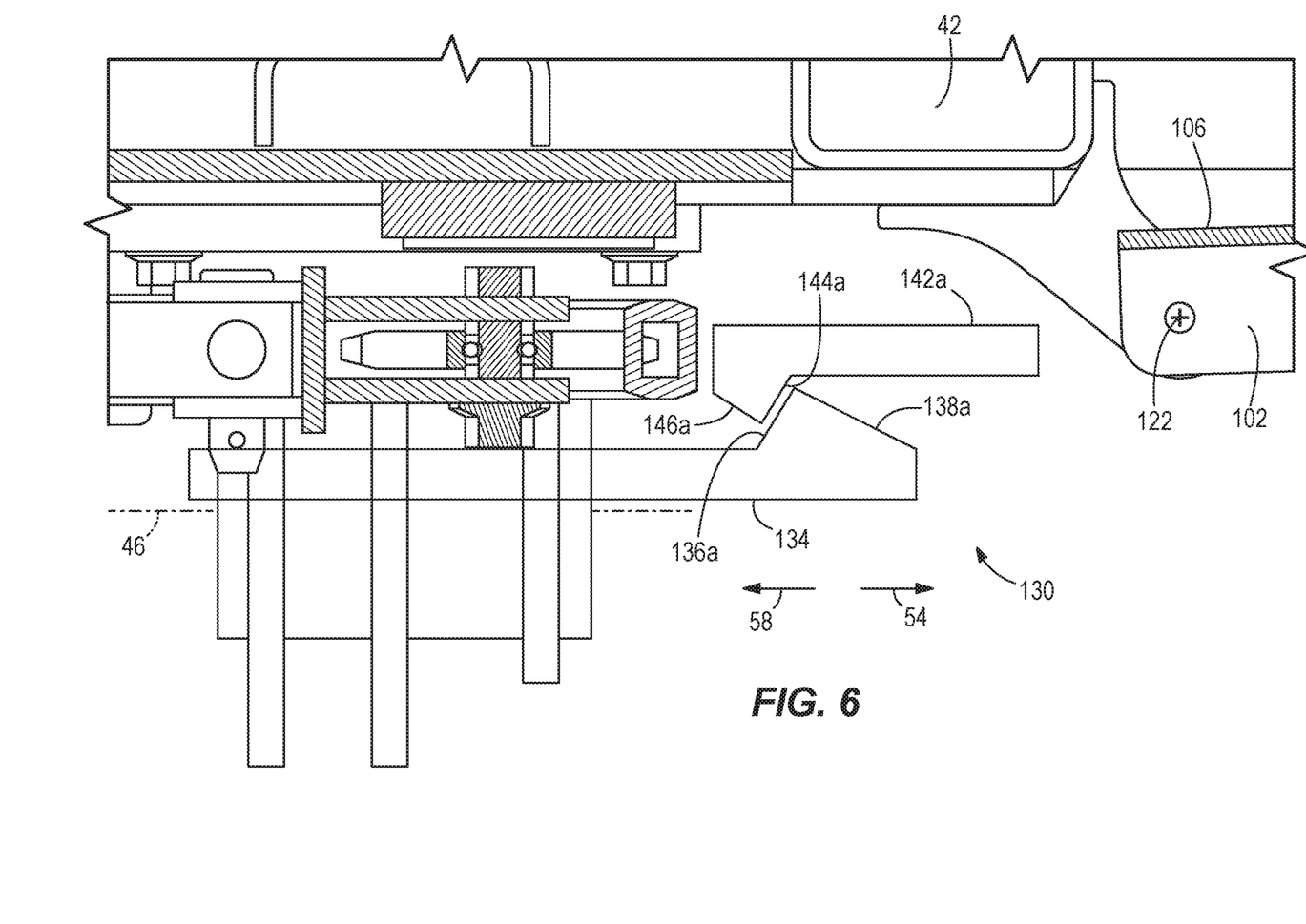
FIG. 6 is a detailed view of the retraction linkage of FIG. 5.

With reference to FIGS. 5 and 6, a retraction linkage/mechanism 130 is coupled between the moving assembly 50 and the extendable carriages 86, 90 and is configured to independently move the extendable carriages 86, 90 towards the accumulator support frame 42 into the retracted position (FIG. 2). The retraction linkage 130 includes a first linkage or wedge member 134 and second linkage or wedge members 142a, 142b. In one embodiment, the first linkage member 134 is positioned between the accumulator support frame 42 and the second linkage members 142a, 142b (FIG. 5). In another embodiment, the second linkage members 142a, 142b are positioned between the accumulator support frame 42 and the first linkage member 134 (FIG. 6).

The illustrated first linkage member 134 includes a first end with a first angled surface 136a and a second angled surface 138a and a second end with a first angled surface 136*b* and a second angled surface 138*b*. The first angled surfaces 136*a*, 136*b* generally face towards the moving assembly 50, and the second angled surfaces 138*a*, 138*b* generally face towards one of the carriages 86, 90. The illustrated first linkage member 134 is attached to the moving assembly 50 for movement therewith in either direction 54, 58. In one embodiment, the first linkage member 134 is coupled to the base 62 of the moving assembly 50. In other embodiments, the first linkage member 134 may be coupled to at least one of the sprockets 82 or the linkage assembly 70. Biasing members 140*a*, 140*b* are coupled between the first linkage member 134 and the accumulator support frame 42 to bias each end of the first linkage member 134 into engagement with the second linkage members 142*a*, 142*b*. In other embodiments, the biasing members 140*a*, 140*b* may be coupled to the second linkage members 142*a*, 142*b*. In one embodiment, the biasing members 140*a*, 140*b* are coupled to the first linkage member 134 such that the biasing members 140*a*, 140*b* remain fixed to the accumulator support frame 42 as the first linkage member 134 moves in either direction 54, 58. In other embodiments, the biasing members 140*a*, 140*b* may be fixed to the first linkage member 134 for movement relative to the accumulator support frame 42. In one embodiment, the biasing members 140 are coil springs and the coil springs may be adjustable to provide different biasing forces acting on the ends of the first linkage member 134. In other embodiments, the natural deflection or bending resistance of the first linkage member 134 may function as a biasing force to bias the first linkage member 134. In other embodiments, the retraction linkage 130 may include two first linkage members 134 with each member 134 extending in one direction 54, 58.

The illustrated second linkage members 142 each include an end with a first angled surface 144*a*, 144*b* and a second angled surface 146*a*, 146*b*, and each second linkage member 142*a*, 142*b* is configured to move in either direction 54, 58. The first angled surfaces 144*a*, 144*b* generally face towards one of the carriages 86, 90, and the second angled surfaces 146*a*, 146*b* generally face towards the moving assembly 50. The second linkage member 142*a* is associated with the first carriage 86, whereas the second linkage member 142*b* is associated with the second carriage 90. With reference to the second linkage member 142*a*, in the illustrated embodiment, the second linkage member 142*a* includes an end 150*a* that is pivotably coupled to the second linkage arm 110 of the extension linkage 98 about a fourth pivot axis 154*a*. The illustrated end 150*a* is located between the pivot axes 118, 126. In one embodiment, the second linkage members 142*a*, 142*b* are coupled to the extension linkages 98 such that a mechanical advantage is created to pivot the extension linkages 98. In other embodiments, each of the second linkage members 142*a*, 142*b* may be coupled to the first linkage arm 102 of the extension linkage 98. In further embodiments, the second linkage members 142*a*, 142*b* may be coupled to or formed integrally with the extendable carriages 86, 90 for movement therewith. Support members 158*a*, 158*b* are fixedly coupled to the accumulator support frame 42 and each support member 158*a*, 158*b* receives a portion of the second linkage members 142*a*, 142*b* to support the second linkage members 142*a*, 142*b* when sliding in either direction 54, 58.

In the illustrated embodiment, the first angled surfaces 136*a*, 136*b*, 144*a*, 144*b* of linkages 134, 142*a*, 142*b* are between about 45 degrees to about 80 degrees (acute) relative to the rotational axis 46 (FIG. 6), and the second angled surfaces 138*a*, 138*b*, 146*a*, 146*b* of both linkages 134, 142*a*, 142*b* are between about 10 degrees to about 45 degrees (acute) relative to the rotational axis 46.

Figure 7:
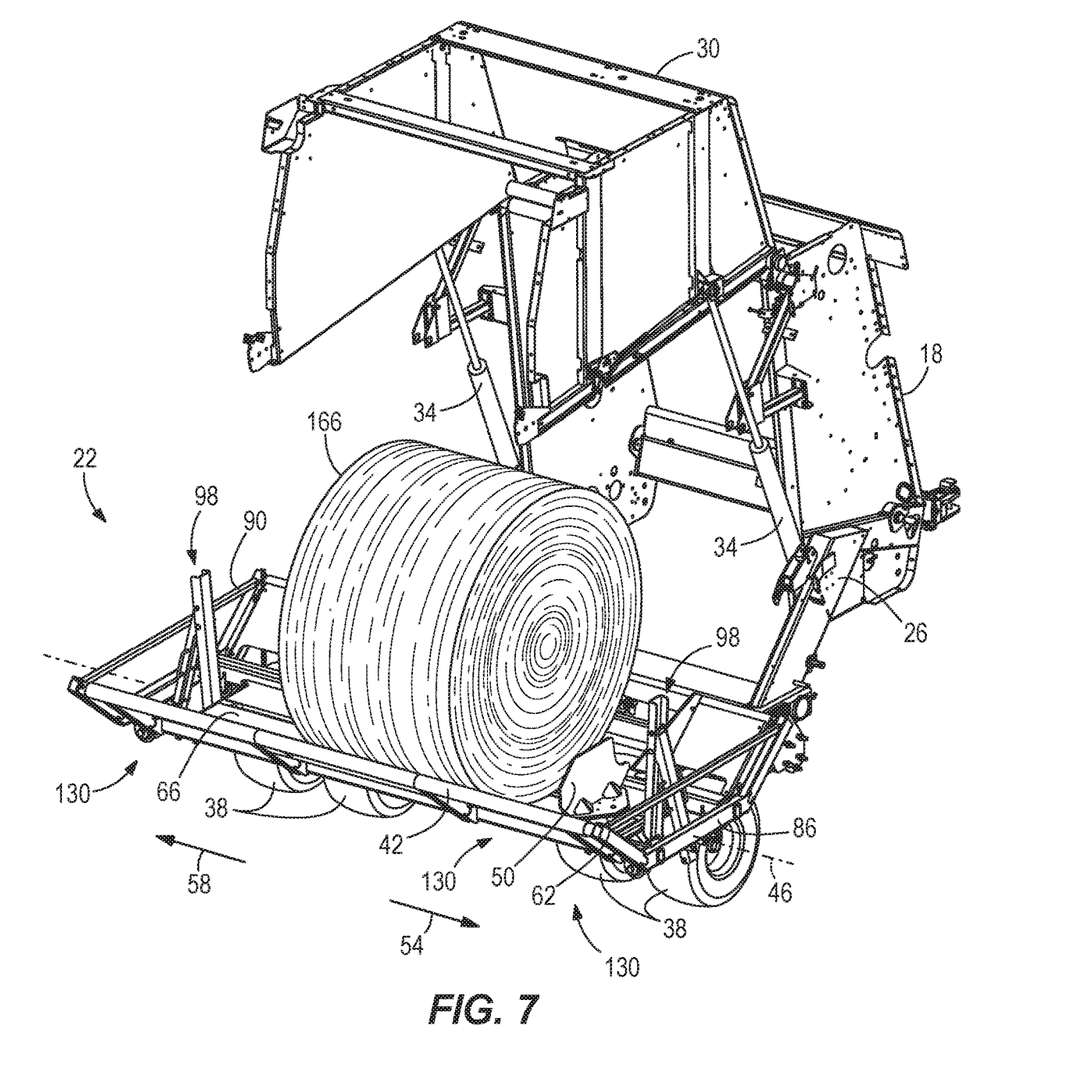
FIG. 7 is a perspective view of the baler and the accumulator of FIG. 1 with a first crop package supported on the accumulator.
Figure 8:
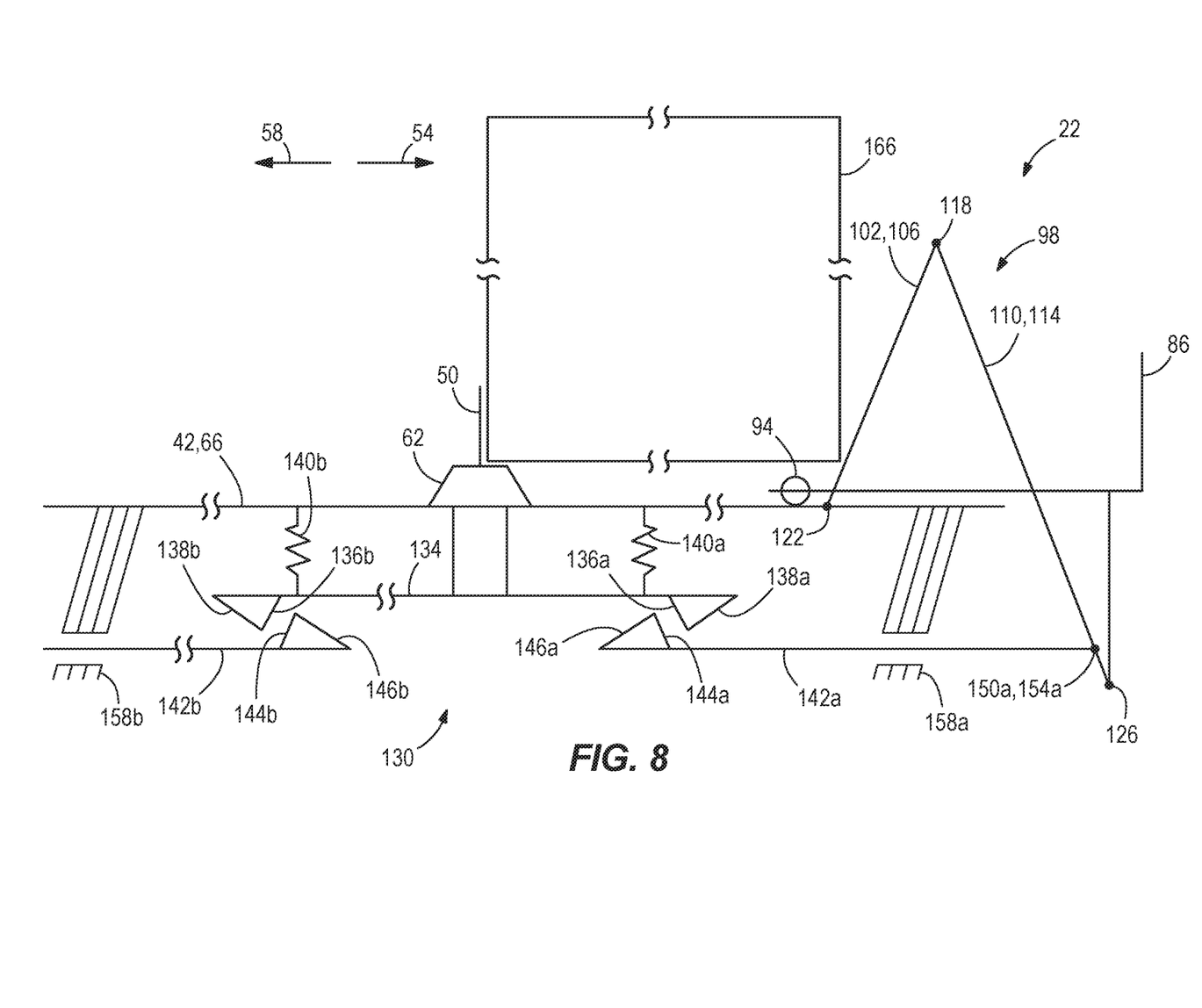
FIG. 8 is a rear view of the accumulator of FIG. 7 including the first crop package moving towards the first extendable carriage.
Figure 9:
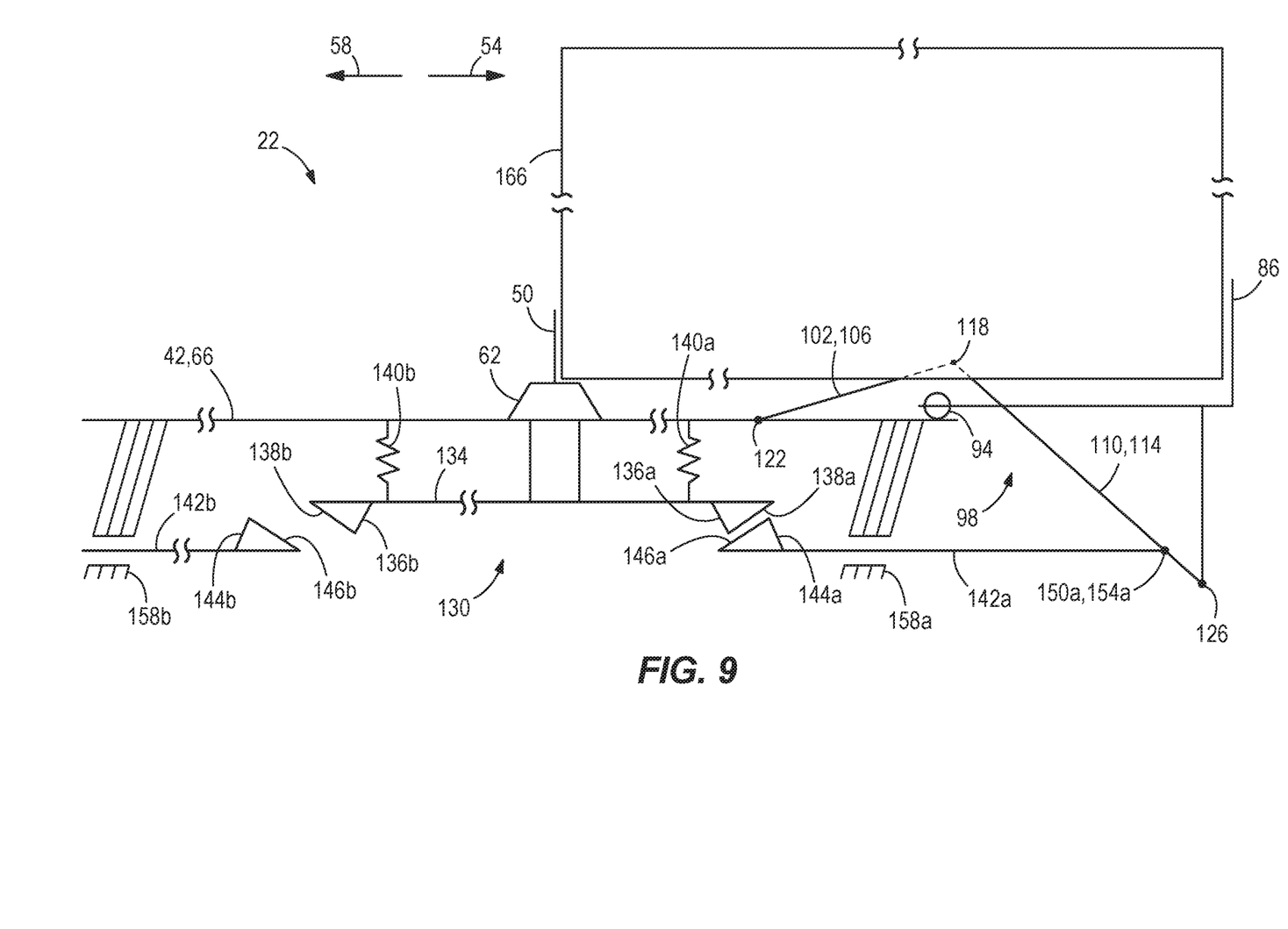
FIG. 9 is a rear view of the accumulator of FIG. 7 including the first crop package configured to move the first extendable carriage into the extended position with the retraction linkage in a disengaged state.

As illustrated in FIG. 7, the carriages 86, 90 are positioned in the retracted position, for ease of transportation and condensed storage of the accumulator 22. However, when the extendable carriages 86, 90 are in the retracted position, the accumulator 22 can only support a single crop package 166 on the accumulator support frame 42. To permit the accumulator 22 to support multiple crop packages at a time, the extendable carriages 86, 90 can be moved into the extended position by movement of the crop packages. As the first crop package 166 exits the baler 18, the moving assembly 50 moves in either direction 54, 58 to push the first crop package 166 in that direction 54, 58. For example and with reference to FIG. 8, the moving assembly 50 pushes the first crop package 166 in the first direction 54 towards the first extendable carriage 86 to initially abut against the top surface 106 of the first linkage arm 102. As the moving assembly 50 continues to move the crop package 166 in the first direction 54, the crop package 166 pushes against the top surface 106 to pivot the first linkage arm 102 about the second pivot axis 122, thereby concurrently pivoting the second linkage arm 110 about the third pivot axis 126. As such, the first extendable carriage 86 is moved into the fully extended position and the first crop package 166 is supported within the first extendable carriage 86 (FIG. 9). In general, the extension linkages 98 enable automatic movement of the extendable carriages 86, 90 into the extended position utilizing the movement of the crop packages.

Operation of the retraction linkage 130 will be described in detail below relative to the second linkage member 142*a* and the first carriage 86; however, the same operation applies with respect to the second linkage member 142*b* and the second carriage 90. In general, the retraction linkage 130 independently moves the carriages 86, 90 into the retracted position when a crop package is not supported on the carriages 86, 90 (e.g., a crop package is removed from the carriages 86, 90). Moreover, the illustrated retraction linkage 130 does not retract the carriages 86, 90 if the carriages 86, 90 support a crop package.

As the first extendable carriage 86 is moved in the first direction 54 from the retracted position (FIG. 8) into the extended position (FIG. 9) by the first crop package 166, the retraction linkage 130 also moves in the first direction 54. In particular, the first linkage member 134 moves with the moving assembly 50, and the extension linkage 98 moves the second linkage member 142*a* in the first direction 54. The extension linkage 98 also functions as a motion multiplier to the carriage 86 in that the carriage 86 and the second linkage 142*a* will extend or move at a faster rate into the extended position than the movement of the moving assembly 50 and the first linkage 134. This relative movement between the linkage members 134, 142*a* results in the second linkage member 142*a* sliding over the first linkage member 134. In one embodiment, the first angled surfaces 136*a*, 144*a* of both linkages 134, 142*a* initially engage (FIG. 5), and as the first crop package 166 pushes against the extension linkage 98, the engagement or frictional forces between the first angled surfaces 136*a*, 144*a* increases against the biasing force of the biasing member 140*a*. The translational movement of the second linkage member 142*a* relative to the first linkage member 134 will eventually allow at least one of the linkage members 134, 142*a* to deflect relative to the other linkage member 134, 142*a* against the biasing force of the biasing member 140*a* causing relative slip between the first angled surfaces 136*a*, 144*a* into a disengaged state (FIG. 9). The illustrated biasing member 140a provides a threshold force needed to transition the retraction linkage 130 from the engaged state to the disengaged state or vice versa.

Figure 10:
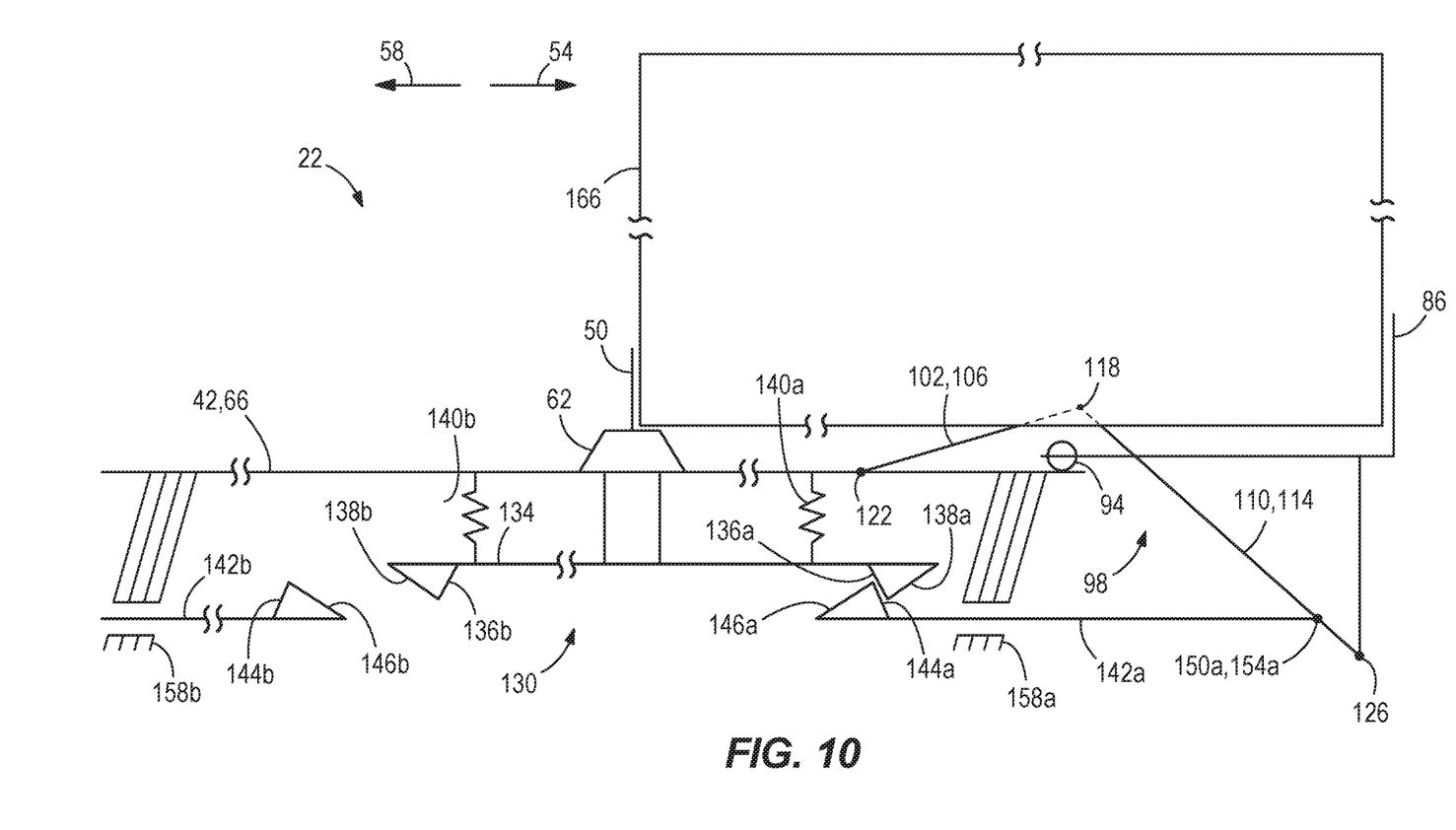
FIG. 10 is a rear view of the accumulator of FIG. 7 including the retraction linkage in an engaged state.

By comparing FIGS. 9 and 10, the first linkage member 134 is further moved via the moving assembly 50 in the first direction 54 such that the second angled surfaces 138a, 146a slide relative to each other for the first angled surfaces 136a, 144a to reengage. Such movement of the first linkage member 134 may be considered an intermediate step or lost motion of the first linkage member 134 to position the first linkage member 134 back into engagement with the second linkage member 142a. In one embodiment, the linkage members 134, 142a may transition from the engaged state (FIG. 8), to the disengaged state (FIG. 9), and back into the engaged state (FIG. 10) in one continuous motion of the moving assembly 50.

In one instance, the first crop package 166 may be removed or dumped onto the agricultural field from the first extendable carriage 86 by pivoting the accumulator support frame 42 about the rotational axis 46. Because the first angle surfaces 136a, 144a are reengaged, an operator of the tractor 14 can then cycle or move the moving assembly 50—and ultimately the retraction linkage 130—in the second direction 58 to move the first extendable carriage 86 via the extension linkage 98 into the retracted position (FIG. 5) without the operator leaving the tractor 14. The retraction linkage 130 enables automatic retraction of the extendable carriage 86 utilizing movement of the moving assembly 50.

In another instance, a second crop package may be generated within the baler 18 and moved onto the accumulator 22 with the moving assembly 50 moving the second crop package in the second direction 58 before dumping the first crop package 166. Because the weight of the first crop package 166 acts upon the extension linkage 98 (e.g., via engagement with the first crop package 166 and the surface 106), the second linkage member 142a is maintained in the position as illustrated in FIG. 10 when the moving assembly 50 moves in the second direction. In particular, the weight of the first crop package 166 supported on the first carriage 86 inhibits the first linkage 134 to move the second linkage 142a in the second direction 58 via engagement between the first angled surfaces 136a, 144a (e.g., the first angled surfaces 136a, 144a are allowed to disconnect and slide over each other, as described in detail above).

However, in an instance where the moving assembly 50 moves in the first direction 54 without also pushing a crop package towards the first extendable carriage 86, the first extendable carriage 86 will not move into the extended position. In this instance, the first linkage member 134 moves in the first direction 54 as the second linkage member 142a remains immobile with the absence of a crop package engaging the extension linkage 98. (FIG. 5). In another embodiment, enough resistance is provided by the first carriage 86 such that the second angled surfaces 138a, 146a slide over each other if the second angled surface 146a of the second linkage member 142a is positioned between the carriage 86 and the second angled surface 138a of the first linkage member 134. In other embodiments, the retraction linkage 130 may be coupled to the first extendable carriage 86 so that the first extendable carriage 86 always moves from the retracted position to the extended position upon movement of the moving assembly 50 in the first direction 54. For example, in an instance where the moving assembly 50 moves in the first direction 54 without pushing a crop package towards the first extendable carriage 86, the moving assembly 50 will move the first extendable carriage 86 into the extended position.

In other embodiments, the retraction linkage 130 may be replaced with a pre-loaded biasing member (e.g., pre-loaded torsional spring). In this embodiment, the pre-loaded biasing member would allow the first crop package 166 to automatically extend the first extendable carriage 86, as described above. The weight of the crop package 166 acts against the pre-loaded biasing member to maintain the crop package 166 supported on the first carriage 86. However, the pre-loaded biasing member automatically retracts the first extendable carriage 86 when the first crop package 166 is dumped or removed from the accumulator 22. In this embodiment, the pre-loaded biasing member acts independently from the movement of the moving assembly 50.

In other embodiments, the retraction linkage 130 may be replaced with hydraulic or electrical actuators coupled to the accumulator support frame 42 and the carriages 86, 90 or the extension linkages 98. In this embodiment, the hydraulic or electrical actuators operate independently relative to the moving assembly 50. For example, movement of the moving assembly 50 does not require movement of the hydraulic or electrical actuators.

In other embodiments, the extendable carriages 86, 90 may be coupled together by the retraction linkage 130 such that as the first extendable carriage 86 moves into the extended position, the second extendable carriage 90 moves into the retracted position, or vice versa, if no crop packages are present on the carriages 86, 90.

In other embodiments, the retraction linkage 130 may simultaneously retract both carriages 86, 90.

In other embodiments, the extension linkages 98 may be biased into the position illustrated in FIG. 5 to automatically retract the carriages 86, 90 from the extended position when the carriages 86, 90 are not supporting a crop package. For example, a torsional spring may be coupled about the first axis 118 to bias the arms 102, 110 towards each other. In other embodiments, the torsional spring may be concentric with at least one of the axes 118, 122, 126.

The invention claimed is:

1. An accumulator coupled to an agricultural baler and configured to support crop packages exiting the agricultural baler, the accumulator comprising:
   a frame including a first end, a second end, and a support structure positioned between the first and the second ends;
   a crop package moving assembly moveably coupled to the frame, the crop package moving assembly configured to move a first crop package in a first direction, the crop package moving assembly also configured to move a second crop package in a second direction opposite to the first direction;
   a first carriage coupled to the first end of the frame and configured to move relative to the frame between a retracted position and an extended position, the first carriage configured to support the first crop package that exits the agricultural baler;
   a second carriage coupled to the second end of the frame and configured to move relative to the frame between a retracted position and an extended position, the second carriage configured to support the second crop package that exits the agricultural baler; and
   a retraction linkage coupled to the crop package moving assembly, the retraction linkage configured to move the first carriage from the extended position into the retracted position while the first crop package is spaced from the first carriage in response to the crop package moving assembly moving in the second direction, the retraction linkage also configured to move the second carriage from the extended position into the retracted position while the second crop package is spaced from the second carriage in response to the crop package moving assembly moving in the first direction.

2. The accumulator of claim 1, further comprising a first extension linkage coupled between the frame and the first carriage and a second extension linkage coupled between the frame and the second carriage, wherein the first carriage is configured to be movable into the extended position in response to the first crop package engaging the first extension linkage, and wherein the second carriage is configured to be movable into the extended position in response to the second crop package engaging the second extension linkage.

3. The accumulator of claim 1, wherein the first carriage is configured to remain in the extended position in response to the first crop package being supported by the first carriage and the crop package moving assembly moving in the second direction, and wherein the second carriage is configured to remain in the extended position in response to the second crop package being supported by the second carriage and the crop package moving assembly moving in the first direction.

4. An accumulator coupled to an agricultural baler, the accumulator configured to support a crop package exiting the agricultural baler, the accumulator comprising:
 a frame including a first end, a second end, and a support structure positioned between the first and the second ends, the support structure configured to support the crop package that exits the agricultural baler;
 a crop package moving assembly moveably coupled to the frame for movement in a first direction and a second opposing direction, the crop package moving assembly configured to move the crop package in the first direction;
 a carriage coupled to the first end of the frame and configured to move relative to the frame between a retracted position and an extended position, the carriage configured to support the crop package; and
 a retraction linkage coupled to at least one of the frame and the carriage, the retraction linkage configured to automatically move the carriage from the extended position into the retracted position while the crop package is spaced from the carriage in response to the crop package moving assembly moving in the second direction.

5. The accumulator of claim 4, wherein movement of the retraction linkage is concurrent with the movement of the crop package moving assembly.

6. The accumulator of claim 5, wherein the carriage is configured to support the crop package when in the extended position, and wherein the carriage is configured to remain in the extended position in response to the crop package being supported by the carriage and the crop package moving assembly moving in the second direction.

7. The accumulator of claim 4, further comprising an extension linkage coupled between the frame and the carriage, wherein the carriage is movable into the extended position in response to the crop package engaging the extension linkage.

8. The accumulator of claim 7, wherein the retraction linkage includes a first linkage member coupled to the crop package moving assembly and a second linkage member coupled to the extension linkage, and wherein the first linkage member is selectively engageable with the second linkage member.

9. The accumulator of claim 8, wherein the first and second linkage members are biased into engagement with each other by a biasing member.

10. The accumulator of claim 8, wherein the first linkage member includes a first angled surface and the second linkage member includes a second angled surface, and wherein engagement between the first and second angled surfaces moves the carriage into the retracted position.

11. An accumulator coupled to an agricultural baler, the accumulator configured to support a crop package exiting the agricultural baler, the accumulator comprising:
 a frame including a first end, a second end, and a support structure positioned between the first and the second ends;
 a crop package moving assembly moveably coupled to the frame in a first direction and in a second direction, the crop package moving assembly configured to move the crop package in the first direction; and
 a carriage coupled to the first end of the frame and configured to move relative to the frame between a retracted position and an extended position, the carriage configured to move into the extended position to support the crop package, the carriage also configured to move from the extended position into the retracted position in response to the crop package being removed from the carriage and the crop package moving assembly moving in the second direction.

12. The accumulator of claim 11, wherein the carriage is configured to remain in the extended position in response to the crop package being supported by the carriage and the crop package moving assembly moving in the second direction.

13. The accumulator of claim 11, further comprising a retraction linkage including a first linkage member coupled to the crop package moving assembly and a second linkage member selectively engageable with the first linkage member.

14. The accumulator of claim 13, wherein the first and second linkage members are biased into engagement with each other by a biasing member.

15. The accumulator of claim 13, wherein the second linkage member is configured to move the carriage into the retracted position in response to engagement between the first and second linkage members and in response to the crop package moving assembly moving in the second direction.

16. The accumulator of claim 13, wherein the first and second linkage members are configured to disengage from each other in response to movement of the carriage in the second direction.

17. The accumulator of claim 11, wherein the carriage is configured to move into the extended position in response to the crop package moving assembly moving in the first direction.

18. The accumulator of claim 17, wherein the carriage is configured to move into the extended position in response to the crop package moving assembly moving the crop package in the first direction.

19. The accumulator of claim 18, further comprising an extension linkage coupled between the frame and the carriage, wherein the carriage is configured to move into the extended position in response to the crop package contacting the extension linkage.

* * * * *